UNITED STATES PATENT OFFICE.

WHEELER P. DAVEY, OF SCHENECTADY, NEW YORK, ASSIGNOR TO GENERAL ELECTRIC COMPANY, A CORPORATION OF NEW YORK.

PROCESS FOR MAKING AND APPLYING JAPAN.

1,294,627.      Specification of Letters Patent.     Patented Feb. 18, 1919.

No Drawing.     Application filed August 18, 1917. Serial No. 186,965.

*To all whom it may concern:*

Be it known that I, WHEELER P. DAVEY, a citizen of the United States, residing at Schenectady, county of Schenectady, in the State of New York, have invented certain new and useful Improvements in Processes for Making and Applying Japan, of which the following is a specification.

The present invention comprises a process of applying an organic material, such for example, as japan without the risk attending the use of an inflammable solvent. A japan ordinarily consists of an asphaltic or pitchy material combined with oleaginous material, such as linseed oil, china wood oil, fish oil, or of a polymerization, condensation, or oxidation product obtained from any one of these materials, or mixtures of them. Sometimes a coloring matter such as bone-black or lamp-black, and frequently an ordinary hydrocarbon oil is also present.

In accordance with my invention, the japan or other oleaginous material is emulsified in water by suitable amounts of an alkali material, preferably ammonia, and the resulting emulsion, diluted if necessary, is applied upon the objects to be coated, preferably by cataphoresis, and the coating finally is hardened by baking.

In order to carry out my invention, the japan in the presence of a suitable amount of water and a small amount of ammonia, or other suitable alkali, such as sodium or potassium hydroxid, is heated in an inclosed space, the mixture being preferably stirred to produce uniformity by both heating and admixture until the emulsion is produced. For example, when working with a japan consisting of asphalt, thickened or polymerized fish oil, china wood oil, copal, and a drier such as manganese resinate, about 8 parts by volume of the japan are mixed with 30 parts by volume of water, and 3 parts by volume of ammonia solution, sp. gr. .90 and heated in a closed receptacle. The heating is carried out while stirring at slow speed at a temperature above the softening point of the japan base, for example, 70° to 125° C. until a uniform emulsion has been produced. The emulsion consists of small droplets of japan, each surrounded by a film of soap produced by the saponification of some of the oil in the japan by the ammonia, or other alkaline material.

In some cases it is preferable to mix the japan with the desired amount of alkali, say, ammonia, in a concentrated state, then to heat to the softening point of the japan, or to a higher temperature and to dilute with water progressively until the desired consistency is attained.

By the described method of producing the emulsion, access of carbon dioxid and oxygen is substantially eliminated. Agitation of the mixture by blowing in air as heretofore practised in emulsifying processes produces undesired oxidation and also the formation of scum by the action of the carbon dioxid contained in air.

The metallic objects to be coated are suspended as an anode in this emulsion, using a cathode of any suitable conducting material, such as tin or iron. A metallic container conveniently may be used as cathode. The voltage required depends upon the character of the japan, voltages of 10 to 250 volts having been used. In some cases the japan may be applied by dipping the object to be coated within the emulsion or painting the emulsion on the object. It is desirable to maintain the emulsion below about 20° C., say at 15° C. to prevent the formation of a surface scum, by the action of the carbon dioxid of the air.

The object with its coat of japan is dried and thereupon baked. The baking temperature will vary with the character of the japan, but it will ordinarily be within limits of about 100 to 260° C. The resulting japan coating has about the same properties as when applied with an ordinary hydrocarbon solvent. Baking incidentally decomposes the compound of oil and ammonia and drives off ammonia. In cases where sodium or potassium hydroxid are used the alkali is not driven off but if present in only small amounts it does little harm by remaining incorporated within the body of the hardened japan.

By the above emulsifying process japans may be made from mixtures of materials which if treated with an ordinary solvent would be incompatible. For example, certain asphaltic and resinous substances tend to jellify in the presence of each other when treated with hydrocarbon solvent in the ordinary way. Components otherwise incompatible may be emulsified separately and then mixed. In fact two substances mixed in this way need not both be fluid. One may be a solid, and when finely divided the particles will adhere to the droplets or will be held in suspension by the soap.

In some cases it is desirable to coat an object either mechanically or by cataphoresis, first with one kind of japan emulsion, chosen more particularly for its adhering properties and then to apply preferably by electrical migration a second coat of japan emulsion which has more desirable surface properties, such as color and luster.

What I claim as new and desire to secure by Letters Patent of the United States is:

1. The process of coating a conductive object with japan which consists in immersing said object in an emulsion of japan, passing an electric current through said solution, using said object as anode, and finally baking the resulting coating to harden the same.

2. The process of applying a coating of an organic material upon a conducting object from an aqueous emulsion which consists in bringing said object into contact with said emulsion and subjecting said emulsion to an electric current, the positive electrode being constituted by said object, thereby depositing the emulsified material upon said object.

3. The process of applying a coating of an oleaginous material upon a conductive object which consists in emulsifying said material in an alkaline aqueous solution and electrically depositing said emulsion upon said object as anode.

4. The process of applying an emulsion of an oleaginous material upon a conductive object which consists in subjecting said emulsion to the action of electrical current between said object as anode and a coöperating cathode.

In witness whereof, I have hereunto set my hand this 17th day of August, 1917.

WHEELER P. DAVEY.